United States Patent
Pang et al.

(10) Patent No.: US 12,027,151 B2
(45) Date of Patent: Jul. 2, 2024

(54) UNSUPERVISED LEARNING OF DISENTANGLED SPEECH CONTENT AND STYLE REPRESENTATION

(71) Applicant: Google LLC, Mountain View, CA (US)

(72) Inventors: Ruoming Pang, New York, NY (US); Andros Tjandra, Mountain View, CA (US); Yu Zhang, Mountain View, CA (US); Shigeki Karita, Mountain View, CA (US)

(73) Assignee: Google LLC, Mountain View, CA (US)

( * ) Notice: Subject to any disclaimer, the term of this patent is extended or adjusted under 35 U.S.C. 154(b) by 244 days.

(21) Appl. No.: 17/455,667

(22) Filed: Nov. 18, 2021

(65) Prior Publication Data

US 2022/0189456 A1    Jun. 16, 2022

Related U.S. Application Data

(60) Provisional application No. 63/124,379, filed on Dec. 11, 2020.

(51) Int. Cl.
*G10L 13/027* (2013.01)
*G10L 21/0308* (2013.01)

(52) U.S. Cl.
CPC ........ *G10L 13/027* (2013.01); *G10L 21/0308* (2013.01)

(58) Field of Classification Search
CPC .......................... G10L 13/027; G10L 21/0308
See application file for complete search history.

(56) References Cited

U.S. PATENT DOCUMENTS

| 10,671,889 B2* | 6/2020 | Poole ............... G06V 10/454 |
| 11,735,156 B1* | 8/2023 | Trueba ................ G10L 13/02 |
| | | 704/200 |
| 2020/0365166 A1* | 11/2020 | Zhang ................ G10L 21/013 |
| 2023/0081659 A1* | 3/2023 | Pan ..................... G10L 13/08 |
| | | 704/259 |

OTHER PUBLICATIONS

Qian, Kaizhi, et al. "Autovc: Zero-shot voice style transfer with only autoencoder loss." International Conference on Machine Learning. PMLR, 2019. (Year: 2019).*
Qian, Kaizhi, et al. "Unsupervised speech decomposition via triple information bottleneck." International Conference on Machine Learning. PMLR, 2020. (Year: 2020).*

* cited by examiner

*Primary Examiner* — Bhavesh M Mehta
*Assistant Examiner* — Nandini Subramani
(74) *Attorney, Agent, or Firm* — Honigman LLP; Brett A. Krueger; Grant Griffith

(57) ABSTRACT

A linguistic content and speaking style disentanglement model includes a content encoder, a style encoder, and a decoder. The content encoder is configured to receive input speech as input and generate a latent representation of linguistic content for the input speech output. The content encoder is trained to disentangle speaking style information from the latent representation of linguistic content. The style encoder is configured to receive the input speech as input and generate a latent representation of speaking style for the input speech as output. The style encoder is trained to disentangle linguistic content information from the latent representation of speaking style. The decoder is configured to generate output speech based on the latent representation of linguistic content for the input speech and the latent representation of speaking style for the same or different input speech.

16 Claims, 6 Drawing Sheets

UNSUPERVISED LEARNING OF DISENTANGLED SPEECH CONTENT AND STYLE REPRESENTATION

CROSS REFERENCE TO RELATED APPLICATIONS

This U.S. patent application claims priority under 35 U.S.C. § 119(e) to U.S. Provisional Application 63/124,379, filed on Dec. 11, 2020. The disclosure of this prior application is considered part of the disclosure of this application and is hereby incorporated by reference in its entirety.

TECHNICAL FIELD

This disclosure relates to unsupervised learning of disentangled speech content and style representation.

BACKGROUND

Speech waveforms are a complex, high-dimensional form of data influenced by a number of underlying factors, which can be broadly categorized into linguistic contents and speaking styles. Learning disentangled latent representations from speech has a wide set of applications in generative tasks, including speech synthesis, data augmentation, voice transfer, and speech compression.

SUMMARY

One aspect of the disclosure provides a linguistic content and speaking style disentanglement model including a content encoder, a style encoder, and a decoder. The content encoder is configured to receive, as input, input speech, and generate, as output, a latent representation of linguistic content for the input speech. The content encoder trained to disentangle speaking style information from the latent representation of linguistic content. The style encoder is configured to receive, as input, the same or different input speech, and generate, as output, a latent representation of speaking style for the same or different input speech. The style encoder is trained to disentangle linguistic content information from the latent representation of speaking style. The decoder is configured to generate output speech based on the latent representation of linguistic content for the input speech and the latent representation of speaking style for the same or different input speech.

Implementations of the disclosure may include one or more of the following optional features. In some implementations, the content encoder generates the latent representation of linguistic content as a discrete per-timestep latent representation of linguistic content that discards speaking style variations in the input speech. The content encoder may include: one or more convolutional layers configured to receive the input speech as input and generate an initial discrete per-timestep latent representation of the linguistic content; and a vector quantization (VQ) layer configured to apply an information bottleneck with straight-through gradients on each initial discrete per-timestep latent representation of the linguistic content to generate the latent representation of linguistic content as a sequence of latent variables representing the linguistic content form the input speech. Here, the content encoder may be trained using a content VQ loss based on the latent representations of linguistic content generated for each timestep, whereby the VQ loss encourages the content encoder to minimize a distance between an output and a nearest codebook.

In some examples, the style encoder includes: one or more convolutional layers configured to receive the input speech as input; and a variational layer with Gaussian posterior configured to summarize an output from the one or more convolutional layers with a global average pooling operation across the time-axis to extract a global latent style variable that corresponds to the latent representation of speaking style. In these examples, during training, the global latent style variable may be sampled from a mean and variance of style latent variables predicted by the style encoder, and during inference, the global latent style variable may be sampled from the mean of the global latent style variables predicted by the style encoder. Additionally or alternatively, the style encoder may be trained using a style regularization loss based on a mean and variance of style latent variables predicted by the style encoder, wherein the style encoder uses the style regularization loss to minimize a Kullback-Leibler (KL) divergence between a Gaussian posterior with a unit Gaussian prior.

In some implementations, the decoder is configured to: receive, as input, the latent representation of linguistic content for the input speech and the latent representation of speaking style for the same input speech; and generate, as output, the output speech comprising a reconstruction of the input speech. The model may be trained using a reconstruction loss between the input speech and the reconstruction of the input speech output from the decoder.

In some additional implementations, the decoder is configured to: receive, as input, the latent representation of linguistic content for the input speech and the latent representation of speaking style for the different input speech; and generate, as output, the output speech comprising linguistic content information specified by the input speech and speaking style information specified by the different input speech. The content encoder and the style encoder may be trained using a mutual information loss to minimize mutual information captured in the latent representations of linguistic content and speaking style.

Another aspect of the disclosure provides a computer-implemented method when executed on data processing hardware causes the data processing hardware to perform operations that include receiving input speech and processing, using a content encoder, the input speech to generate a latent representation of linguistic content for the input speech. The content encoder is trained to disentangle speaking style information from the latent representation of linguistic content. The operations also include processing, using a style encoder, the same or different input speech to generate a latent representation of speaking style for the same or different input speech, and processing, using a decoder, the latent representation of linguistic content for the input speech and the latent representation of speaking style for the same or different input speech to generate output speech. The style encoder is trained to disentangle linguistic content information from the latent representation of speaking style.

This aspect may include one or more of the following optional features. In some implementations, processing the input speech to generate the latent representation of linguistic content includes processing the input speech to generate the latent representation of linguistic content as a discrete per-timestep latent representation of linguistic content that discards speaking style variations in the input speech. The content encoder may include: one or more convolutional layers configured to receive the input speech as input and generate an initial discrete per-timestep latent representation of the linguistic content; and a vector quantization (VQ)

layer configured to apply an information bottleneck with straight-through gradients on each initial discrete per-timestep latent representation of the linguistic content to generate the latent representation of linguistic content as a sequence of latent variables representing the linguistic content form the input speech. Here, the content encoder may be trained using a content VQ loss based on the latent representations of linguistic content generated for each timestep, whereby the VQ loss encourages the content encoder to minimize a distance between an output and a nearest codebook.

In some examples, the style encoder includes: one or more convolutional layers configured to receive the input speech as input; and a variational layer with Gaussian posterior configured to summarize an output from the one or more convolutional layers with a global average pooling operation across the time-axis to extract a global latent style variable that corresponds to the latent representation of speaking style. In these examples, the operations may further include sampling the global style latent variable from a mean and variance of style latent variables predicted by the style encoder during training, and sampling the global style latent variable from the mean of the global latent style variables predicted by the style encoder during inference. Additionally or alternatively, the style encoder may be trained using a style regularization loss based on a mean and variance of style latent variables predicted by the style encoder, wherein the style encoder uses the style regularization loss to minimize a Kullback-Leibler (KL) divergence between a Gaussian posterior with a unit Gaussian prior.

In some implementations, the decoder is configured to: receive, as input, the latent representation of linguistic content for the input speech and the latent representation of speaking style for the same input speech; and generate, as output, the output speech comprising a reconstruction of the input speech. The model may be trained using a reconstruction loss between the input speech and the reconstruction of the input speech output from the decoder.

In some additional implementations, the decoder is configured to: receive, as input, the latent representation of linguistic content for the input speech and the latent representation of speaking style for the different input speech; and generate, as output, the output speech comprising linguistic content information specified by the input speech and speaking style information specified by the different input speech. The content encoder and the style encoder may be trained using a mutual information loss to minimize mutual information captured in the latent representations of linguistic content and speaking style.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
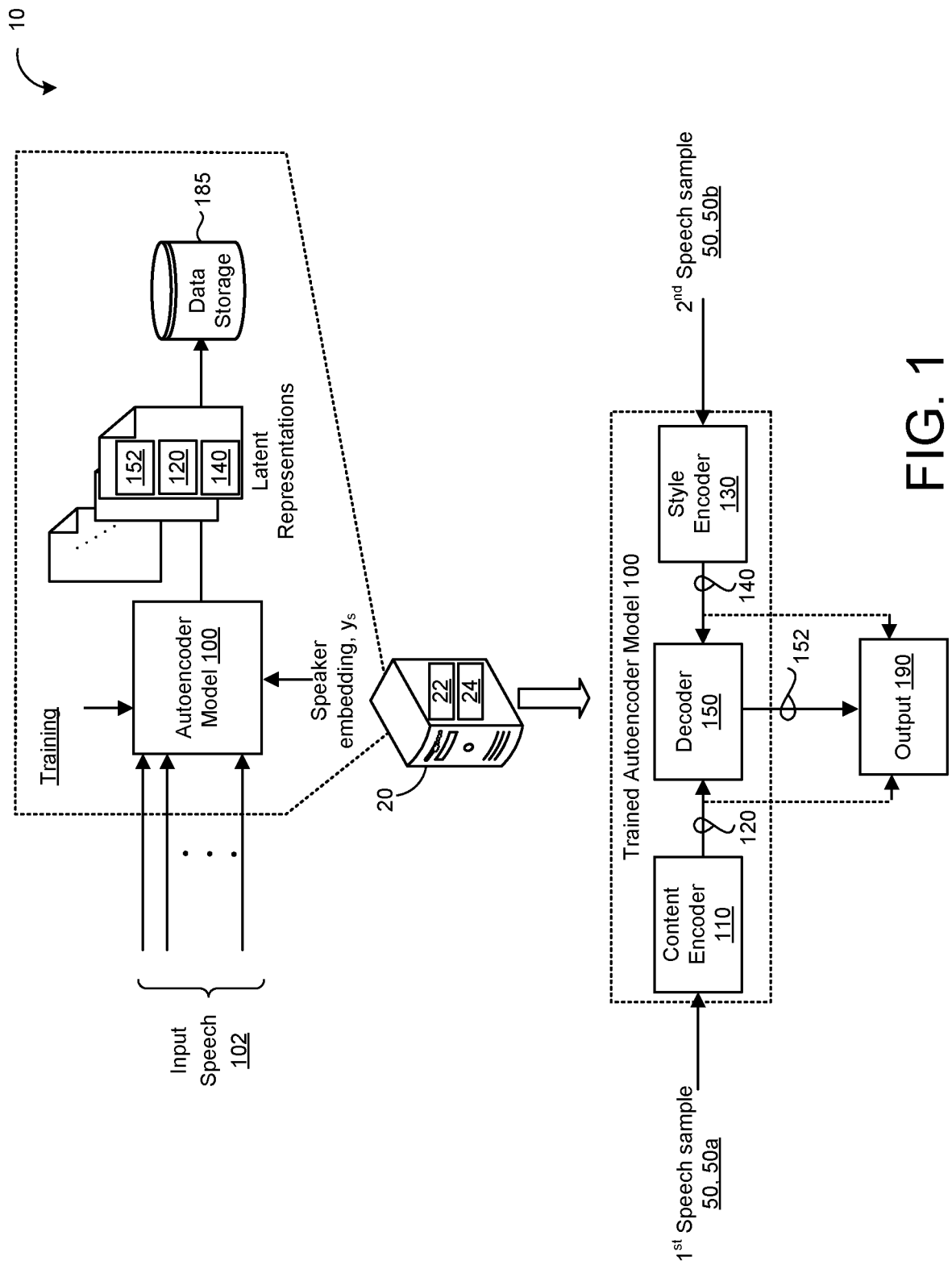
FIG. 1 is a schematic view of an example system for disentangling latent representations of linguistic content and speaking style from input speech.

Speech waveforms are a complex, high-dimensional form of data influenced by a number of underlying factors, which can be broadly categorized into linguistic contents (e.g., phonemes) and speaking styles. Learning disentangled latent representations of linguistic content and speaking style from speech has a wide set of applications in generative tasks, including speech synthesis, data augmentation, voice transfer, and speech compression. Disentangling latent representations from speech can also be helpful for downstream tasks such as automated speech recognition and speaker classification.

Techniques for unsupervised latent representation learning for speech are gaining interest due to the cost, complexity, and privacy concerns around collecting labeled speech data. Notably, learning latent representations of speaking style from unsupervised data are of particular interest due to the inherent inability to describe prosody of speech with human labels. Learning global style tokens from a dictionary of embeddings from speech without prosody labels provide an ability to learn global representations from entire speech sequences. Additionally, fine-grain localized representations of speech can be learned by applying self-supervised learning to unlabeled speech data and extracting localized latent representations that can be fine-tuned for speech recognition.

Implementations herein are directed toward unsupervised representation learning for speech by learning both global and localized representations. Specifically, implementations are directed toward disentangling latent representations of linguistic content and speaking style from speech using an autoencoder model that includes a content encoder, a style encoder, and a decoder. The autoencoder model may be interchangeably referred to as a linguistic content and speaking style disentanglement model. The content encoder is associated with a local encoder having a vector-quantized (VQ) layer configured to learn discrete per-timestep (e.g., per frame) latent representations capturing linguistic content from input speech while the style encoder is associated with a variational autoencoder (VAE) configured to extract per-utterance latent representations capturing speaking style from the input speech. During training, the decoder reconstructs an input speech sample to the content and style encoders using the latent representations of linguistic content and speaking style output from the content and style encoders. During inference, the decoder may generate a new speech feature by combining the latent representation of linguistic content extracted from a first speech sample and the latent representation of speaking style extracted from a different second speech sample.

In additional implementations, a mutual information loss is applied to the content and style encoders to minimize mutual information from the latent representations of linguistic content and speaking style output from the content and style encoders. As will become apparent, training the content and style encoders to minimize extracting mutual information in their respective outputs further disentangles the latent representations of linguistic content (e.g., local representations) and the latent representations of speaking style (e.g., global representations) from speech.

The autoencoder model includes a content encoder, a style encoder 130, and a decoder. The decoder is configured to receive both content and style latent representations as input, and generate speech features as output. That is, the decoder is configured to reconstruct the input speech as the output speech features. During some applications, the trained autoencoder model may omit the use of the decoder.

FIG. 1 shows an example system 10 for training an autoencoder model (e.g., linguistic content and speaking style disentanglement model) 100 to disentangle latent representations of linguistic content 120 and speaking style 140 from input speech 102. The input speech 102 may include a sequence of speech features. In some examples, the sequence of speech features representing the input speech 102 include log-Mel-filterbank features. The system 10 includes a computing system 20 having data processing hardware 22 and memory hardware 24 in communication with the data processing hardware 22 and storing instructions that cause the data processing hardware 22 to perform operations. In some implementations, the computing system 20 (e.g., the data processing hardware 22) executes a training process to train the autoencoder model 100 on a plurality of samples of input speech 102 corresponding to utterances spoken by one or more different speakers. The training process aims to reconstruct each sample of input speech 102 by decoding latent representations of linguistic content 120 and speaking style 140 extracted from the input speech 102 and combined to generate corresponding speech features 152. The training process may store the latent representations of linguistic content 120 and speaking style 140 extracted from each sample of input speech 102 and the corresponding output speech features 152 in data storage 185 overlain on the memory hardware 24.

During inference, the computing system 20 (e.g., the data processing hardware 22) or a user computing device (not shown) executes the trained autoencoder model 100 that includes a content encoder 110, a style encoder 130, and a decoder 150 to generate new speech features 152 as synthesized speech that conveys the linguistic content extracted from a first speech sample 50, 50a and having a speaking style extracted from a second speech sample 50, 50b. Here, the content encoder 110 is configured to predict per-timestep latent representations of linguistic content 120 from the first speech sample 50a spoken by a first speaker while the style encoder 130 is associated with a variational autoencoder (VAE) configured to extract per-utterance latent representations of speaking style 140 from the different second speech sample 50b spoken by a different speaker. Notably, the first and second speech samples 50a, 50b spoken by the different speakers may include different linguistic content and the first and second speakers may speak with different speaking styles (e.g. prosody/accent). In this scenario, the trained autoencoder model 100 is adapted for use in a voice transfer application (e.g., "Say it like this") where the new speech features 152 generated as synthesized speech preserve the linguistic content of the first speech sample 50a spoken by the first speaker but in the voice and speaking style of the second speaker. In some examples, the first speech sample 50a is spoken in a different language than the second speech sample 50b. The trained autoencoder model 100 may similarly be applied in data augmentation applications where latent representations of speaking style 140 are extracted from speech samples spoken by different users and conveying different speaking styles to produce new speech features 152 from the decoder 150 that convey different augmentations of synthesized speech for a same linguistic content.

The decoder 150 is configured to generate the speech features 152 as output by combining the latent representations of linguistic content 120 output by the content encoder 110 and the latent representation of speaking style 140 output by the style encoder 130. An output 190 may receive the output speech features 152 from the decoder 150. The output 190 may include a speech recognition model or a speaker identification model that is trained on the output speech features 152. Optionally, the output 190 may not receive the speech features 152 and instead receive latent representations of linguistic content 120 and speaking style 140 from the content and style encoders 110, 130, respectively.

Figure 2:
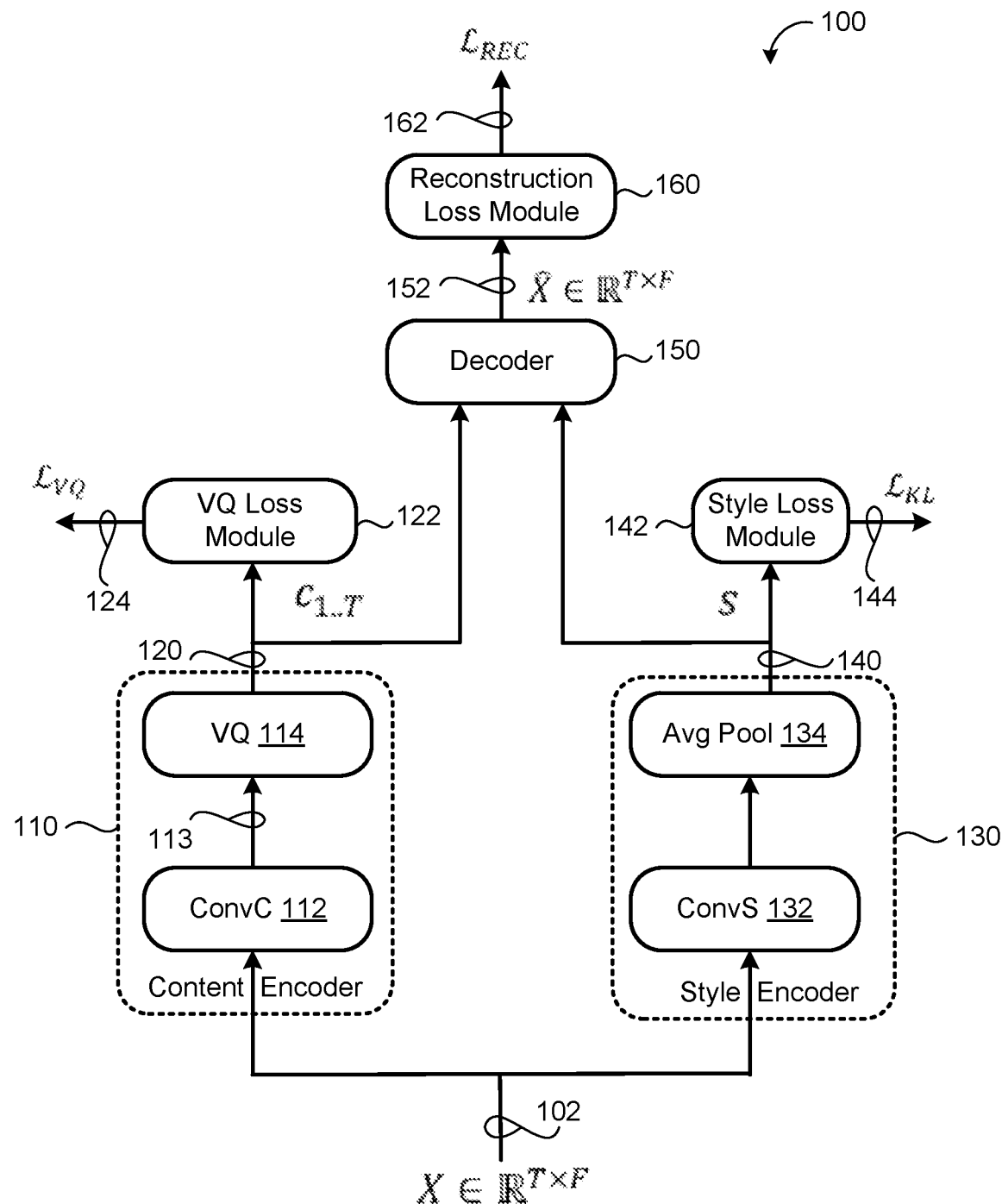
FIG. 2 is a schematic view of a linguistic content and speaking style disentanglement model that includes a style encoder, a content encoder, and a decoder.

FIG. 2 shows an example of the autoencoder model 100 for disentangling the latent representations of linguistic content 120 and speaking style 140 from the input speech 102, $X \in \mathbb{R}^{T \times F}$. The autoencoder model includes the content encoder 110, the style encoder 130, and the decoder 150. The decoder 150 is configured to receive both content and style latent representations 120, 140 as input, and generate speech features 152 as output. During some applications, the trained autoencoder model 100 may omit the use of the decoder 150.

The content encoder 110 may include a neural network having one or more convolutional layers 112 and a vector quantization (VQ) layer 114. In some examples, the content encoder 110 includes ten (10) 1-dimensional convolutional layers with residual connections. A time stride of two may be applied in the third convolutional layer to reduce a final output length in half (e.g., from T to T/2). The one or more convolutional layers 112 of the content encoder 110 receives the input speech 102 to generate an initial latent representation 113 from the speech 102 and the VQ layer 114 applies an information bottleneck with straight-through gradients on the initial latent representation 113 to capture necessary localized information, such as phoneme or subword-like latent representations, and discard speaking style variations. Thus, the VQ layer 114 extracts a sequence of latent variables, $C=[c_1, \ldots, c_T] \in \mathbb{R}^{T \times D_c}$, that represent the linguistic content from the input speech 102. Accordingly, the content encoder 110 is trained to learn to predict a discrete per-timestep (e.g., per frame) latent representation of linguistic content 120 ($c_1, \ldots, c_T$) that discards, or is otherwise disentangled from, speaking style variations in the input speech 102.

In some implementations, during training, a VQ loss module 122 determines a content VQ loss 124 for the content encoder 110 based on the latent representations of linguistic content 120 predicted for each timestep. The content VQ loss 124 encourages the content encoder output z to minimize a distance between itself and a nearest codebook $E_i$. The VQ loss module 122 may determine the content VQ loss 124 using the following equation.

$$\mathcal{L}_{VQ} = \|\text{ConvC}(X) - sg(E_4)\|_2^2 \qquad (1)$$

where sg (•) denotes stop gradient operations. The content VQ loss 124 corresponds to a self-supervised loss similar to a clustering loss where the model is encouraged to cluster continuous data points and move other data points close to clusters.

The style encoder 130 may include a neural network having one or more convolutional layers 132 and a variational layer 134 with Gaussian posterior configured to summarize the output from the convolution layer 132 with a global average pooling operation across the time-axis. In some examples, the style encoder 130 processes the input speech 102 using six (6) residual one-dimensional convolutional layers with time stride two (2) on three different layers to result in 8× time-length reduction. The global average pooling operation extracts a global latent style variable, $s \in \mathbb{R}^{D_s}$, that represents the speaking style 140 from the input speech 102. During training, the global latent style variable s corresponding to the latent representation of speaking style 140 is sampled as follows.

$$s_\mu, s_\sigma^2 = \text{EncS}(X); s \sim \mathcal{N}(s_\mu, s_\sigma^2) \quad (2)$$

where $s_\mu$ denotes a mean of the style variables predicted by the style encoder 130 and $s_\sigma^2$ denotes a variance of the style variables predicted by the style encoder. During inference, the global latent style variable s may simply correspond to the mean of the style variables $s_\mu$ predicted by the style encoder 130 from the input speech 102. Accordingly, the style encoder 130 is trained to learn to extract a per-utterance latent representation of speaking style 140 that is disentangled from linguistic content 120 in the input speech 102.

During training, a style loss module 142 may determine a style regularization loss 144, $\mathcal{L}_{KL}$, based on the mean $s_\mu$ and variance $s_\sigma^2$ of the style variables predicted by the style encoder 130. The style encoder 130 uses the style regularization loss 144 to minimize a Kullback-Leibler (KL) divergence between a Gaussian posterior $\mathcal{N}(s_\mu, s_\sigma^2)$ with a unit Gaussian prior N(0, 1). The style loss module 142 may determine the style regularization loss 144 using the following equation.

$$\mathcal{L}_{KL} = \mathbb{D}_{KL}\mathcal{N}(s_\mu, s_\sigma^2) \| \mathcal{N}(0,1)) \quad (3)$$

In some implementations, the decoder 150 is configured to receive, as input, both the latent representations of linguistic content and speaking style 120, 140 output from the content and style encoders 110, 130, respectively, and reconstruct features 152, $\hat{X} \in \mathbb{R}^{T \times F}$, during training. During training, a reconstruction loss module 160 generates a reconstruction loss 162 between the input speech 102, X, serving as ground truth and the reconstructed speech 152, $\hat{X}$, for use in optimizing the model 100 to minimize both L1 and L2-norm squared distance between X and $\hat{X}$. In some configurations, the decoder 150 includes ten (10) 1-dimensional convolution layers with residual connections fed speaking style information by concatenating the latent representation of speaking style 140, s, in the channel axis on {1, 3, 5, 7}-th layers.

While the content encoder 110 and the style encoder 130 are each optimized to predict their respective latent representations of linguistic content 120 and speaking style 140 disentangled from one another, the quantized variables $c_1, \ldots, c_T$ representing the linguistic content 120 from the input speech 102 may inherently capture non-content information such as speaking style information. Without using explicit labels during training, the model 100 may estimate an minimize mutual information (MI) from the respective latent representations of linguistic content $(c_1, \ldots, c_T)$ 120 and speaking style (s) 140 output from the content and style encoders 110, 130. Thus, minimizing mutual information to reduce an amount of correlation between encoder outputs optimizes the model 100 to further disentangle the local and global representations of linguistic content and speaking style.

In some implementations, for measuring mutual information between the two encoder outputs, a loss based on noise-contrastive estimation ($I_{NCE}$) is used to estimate a lower bound MI between content and style as follows.

$$I(X;Y) \geq E\left[\frac{1}{K}\sum_{i=1}^{K} \log \frac{e^{S_c(C_i, S_i)}}{\frac{1}{K}\sum_{j=1}^{K} e^{S_c(C_i, S_j)}}\right] \triangleq I_{NCE} \quad (6)$$

where K is the number of samples across different utterances, Sc (•,•) is a neural network scorer, $C_i$ is the initial latent representation from the content encoder 110 prior to quantization, and $S_i$ is the latent representation of speaking style 140 output from the style encoder 130.

Thereafter, $I_{NCE}$ is maximized with respect to Sc and $I_{NCE}$ is minimized with respect to a final loss $\mathcal{L}$ for the model 100 using the following equation.

$$\max_{S_c}, \min_{EncC, EncS, Dec}(L + I_{NCE}) \quad (7)$$

The final loss $\mathcal{L}$ for the model 100 may be determined based on a combined sum ($\mathcal{L}=\mathcal{L}_{REC}+0.25\mathcal{L}_{VQ}+\mathcal{L}_{KL}$) of the content VQ loss 124, the style regularization loss 144, and the reconstruction loss 162. Finally, to measure the MI, adaptive gradient scaling is applied to stabilize the loss of Equation (7) by updating the model parameters at each timestep as follows.

$$g_\theta = \partial L / \partial \theta; g_a = \partial I_{NCE} / \partial \theta \quad (8)$$

$$g_b = \min(\|g_a\|_2, \|g_\theta\|_2) \frac{g_a}{\|g_a\|_2} \quad (9)$$

$$\theta = \theta - (g_\theta + g_b) \quad (8)$$

$$Sc = Sc + \partial I_{NCE} / \partial Sc \quad (10)$$

A mutual information loss may be applied to further disentangle the local and global representations. Notably, the global style representation captured by the global VAE provides sufficient speaker information from only one example per speaker to permit training a linear projection layer on top of the global style representation to obtain a speaker classification model.

Experiments show that increasing a VQ-VAE codebook size of the content encoder 110 optimizes the model 100 for preserving linguistic content from input speech 102. Additionally, applying the mutual information loss to minimize mutual information captured by the content and style encoders 110, 130 further improves linguistic content preservation. In a first non-shuffle scenario, optimized for measuring how well the model 100 compresses speech, the content and style encoders 110, 130 each receive the same input speech 102, $X_i$, and the decoder 150 predicts speech features 152, $\hat{X}$, that correspond to a reconstruction of the input speech. In a second shuffle scenario, optimized for measuring preservation of linguistic content by VQ-VAE codebooks, the content encoder 110 receives input speech $X_i$ and the style encoder 130 receives different input speech 102, $X_j$, and the decoder 150 predicts speech features 152, $\hat{X}$, to determine how well the speech features $\hat{X}$ preserve the linguistic content of the original speech $X_i$. To evaluate how well the predicted speech features output by the decoder compared to the original linguistic content from the input speech, an automated speech recognizer transcribed the predicted speech features $\hat{X}$ and a word error rate is calculated for the transcription with ground-truth text for the original input speech $X_i$ fed to the content encoder 110. Table 1 below depicts the word error rates calculated for both the shuffle and non-shuffle scenarios with varying codebook sizes with and without mutual information loss.

TABLE 1

| Codebook Size | MI Loss | WER (%) No shuffle | WER (%) Shuffle |
|---|---|---|---|
| 256 | No | 4.6 | 7.7 |
|  | Yes | 4.4 | 7.0 |
| 512 | No | 4.2 | 7.0 |
|  | Yes | 3.8 | 6.8 |
| 1024 | No | 3.7 | 6.3 |
|  | Yes | 3.6 | 6.1 |

Figure 3:
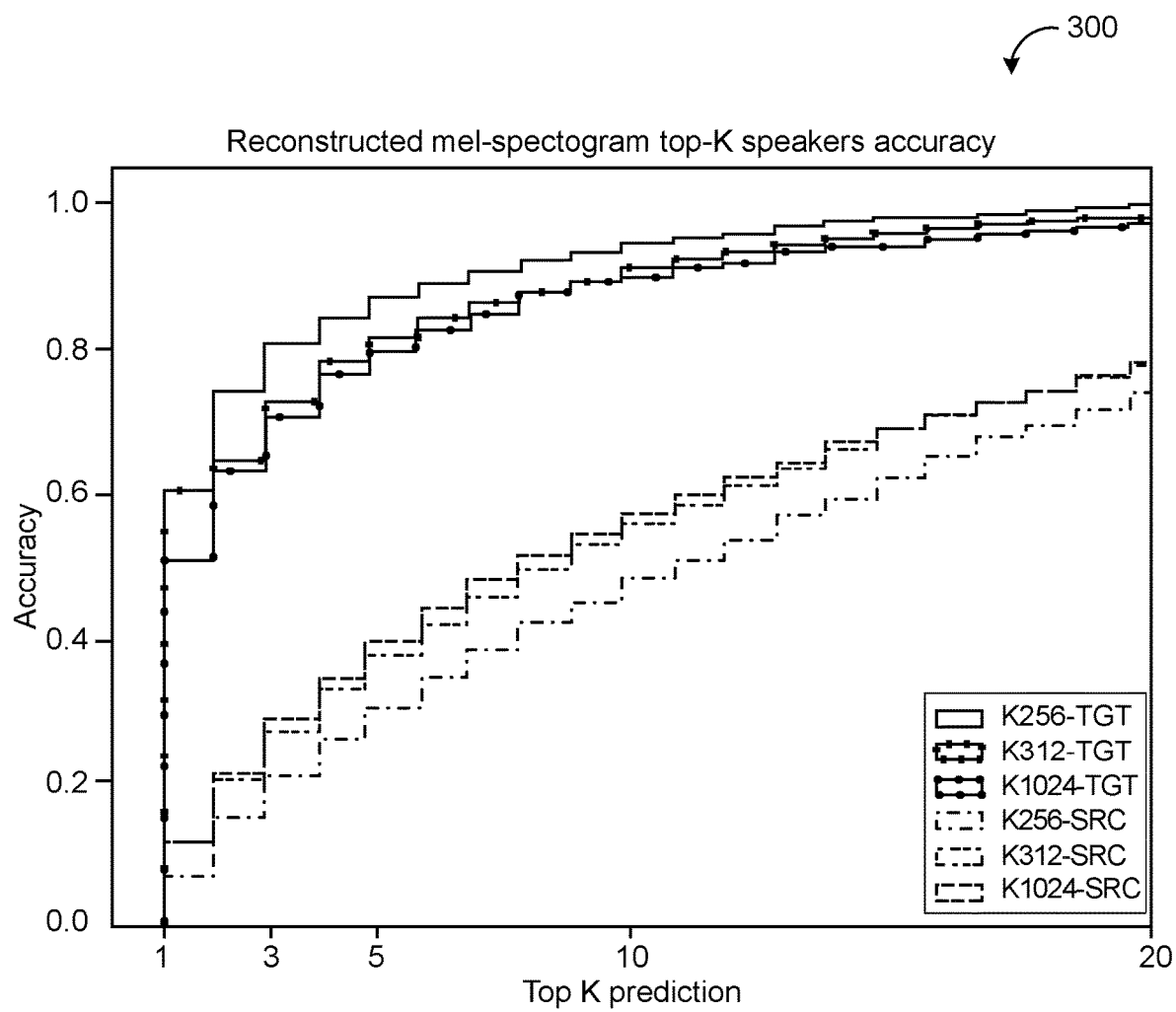
FIG. 3 is a plot of top-k speaker accuracy compared to content speaker ID and style speaker ID for varied codebook size.

Experiments further measure how well the style encoder extracts and preserves original speaking style from the input speech 102. In these experiments, the content and style encoders 110, 130 receive different input speech $X_i$, $X_j$ and the decoder 150 predicts speech features $\hat{X}$ corresponding to generated speech based on the latent representations of linguistic content and speaking style 130, 140 output from the encoders 110, 130. To evaluate speaker similarity between the generated speech and the different input speech $X_i$, $X_j$. A speaker recognition model is trained using ground-truth speaker labels for the input speech $X_i$, $X_j$ and a softmax output is predicted on the predicted speech features $\hat{X}$ output by the decoder 150. The softmax output predicts are used to calculate metrics such as average ranking, top-1, top-3, and top-5 accuracy compared to the ground truth speaker on the input speech $X_j$ fed to the style encoder 130. FIG. 3 depicts a plot 300 of top-k speaker accuracy compared to content (SRC) speaker ID and style (TGT) speaker ID for varied codebook size for models trained with MI loss. The plot 200 shows that the generated speech captured a speaker style much closer to the input speech $X_j$ fed to the style encoder 130 than the input speech $X_i$ fed to the content encoder 110. Table 2 below also shows how speaker style accuracy changes for the input speech $X_j$ fed to the style encoder 130 for varying codebook sizes with and without application of MI loss. Specifically, Table 2 shows that style and content information become more disentangled as codebook size increases, while application of MI loss improves disentanglement especially for smaller codebook sizes. Thus, Tables 1 and 2 reveal tradeoffs between content reconstruction and style disentanglement when considering codebook size.

TABLE 2

| Codebook | MI | Avg. | Top-1 | Top-3 | Top-5 |
|---|---|---|---|---|---|
| 256 | No | 3.9 | 0.5 | 0.72 | 0.81 |
|  | Yes | 2.9 | 0.6 | 0.8 | 0.87 |
| 512 | No | 3.9 | 0.5 | 0.71 | 0.8 |
|  | Yes | 3.7 | 0.5 | 0.73 | 0.81 |
| 1024 | No | 4.0 | 0.52 | 0.72 | 0.8 |
|  | Yes | 4.0 | 0.51 | 0.71 | 0.8 |

After training the model 100 to learn disentangled latent representations of linguistic content and speaking style from speech, the trained model 100 may be used in a wide set of applications in generative tasks, including speech synthesis, data augmentation, voice transfer, and speech compression. The ability of the trained model 100 to disentangle these latent representations from speech can also be helpful for downstream tasks such as training automated speech recognition and/or speaker recognition/classification models. Generally, the trained model 100 can be used in two groups of applications: encoder-only applications and encoder-decoder applications. Encoder-decoder applications, such as voice transfer applications and data augmentation applications, are discussed above with reference to FIG. 1.

Figure 4:
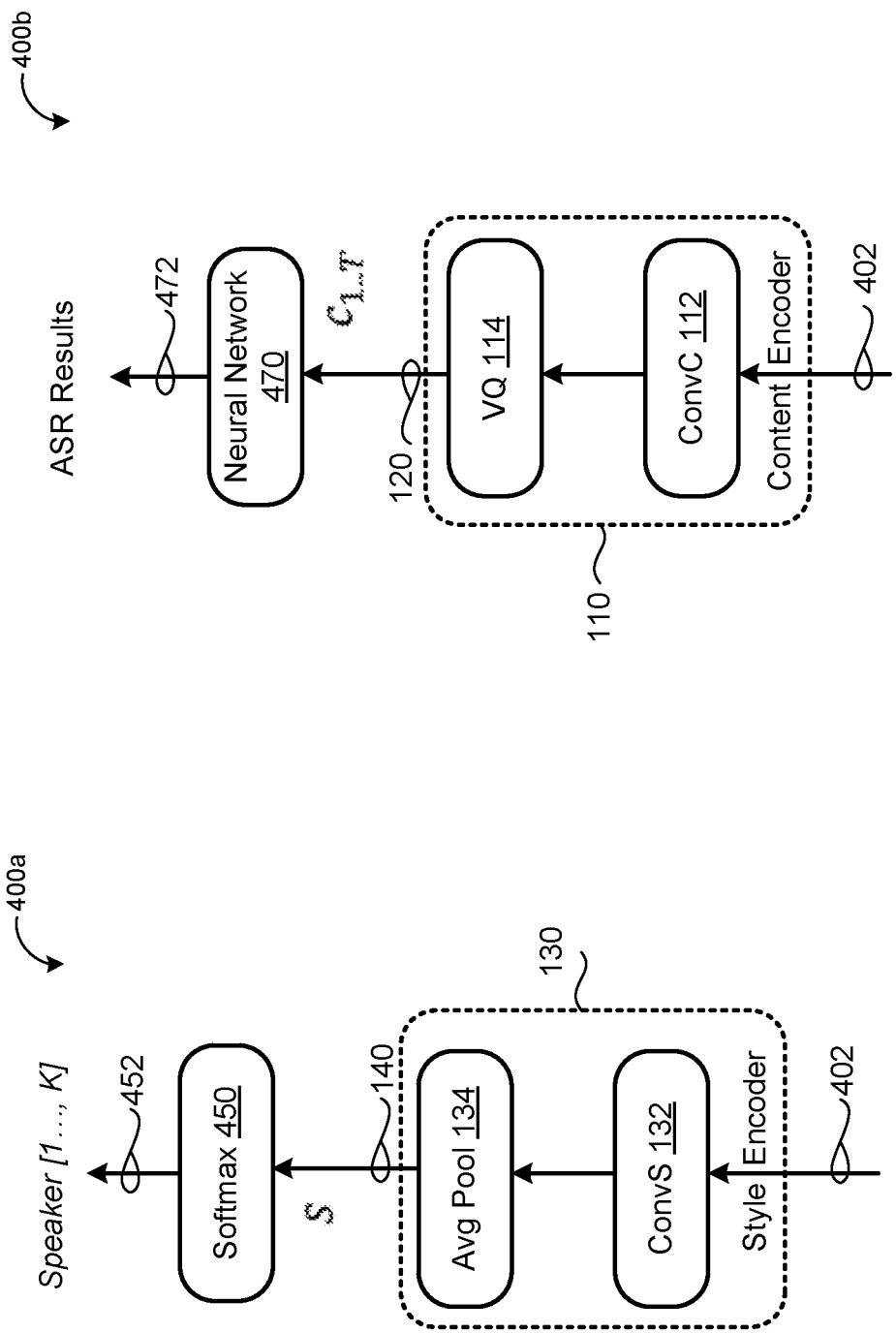
FIG. 4A is a schematic view of an example speaker recognition model implementing the style encoder from the linguistic content and speaking style disentanglement model of FIGS. 1 and 2.
FIG. 4B is a schematic view of an example speech recognition model implementing the content encoder from the linguistic content and speaking style disentanglement model of FIGS. 1 and 2.

FIG. 4A shows a notable encoder-only application that includes using the trained style encoder 130 as a speaker recognition model 400 for speaker recognition tasks. Here, the trained style encoder 130 is adapted for a speaker recognition application by pre-training the style encoder 130 on a large amount of unlabeled data including input speech corresponding to utterances spoken by one or more speakers. Then, a small amount of labeled data fine-tunes the pre-trained style encoder to perform a few-shot speaker recognition task. The labeled data may vary the number of speech examples 402 per speaker, termed as "1-shot" and "3-shot". For the speaker recognition task, a linear projection layer (e.g., Softmax layer) is overlain on top of the style encoder to compute logits for speaker classification based on latent representations of speaking style 140 output from the style encoder 130 for given input speech. During the fine-tuning, all parameters are frozen except for the projection layer. The style encoder 130 and projection layer 450 may form the speaker recognition model 400. The speaker recognition model 400a may be used for performing different speaker recognition tasks such as, without limitation, detecting different speakers (e.g., Diarization), computing speaker IDs, and/or voice matching for enrollment/verification.

FIG. 4B shows another encoder-only application that includes using the trained content encoder 110 as a speech recognition model 400b for generating speech recognition results for input speech 402. The content encoder 110 may be leveraged to extract latent representations of linguistic content 120 to provide local information for use in bootstrapping automated speech recognition (ASR) training by using the latent representations of linguistic content 120 and leveraging unsupervised data. In the example shown, a neural network 470 is overlain on top of the content encoder 110 to provide the speech recognition model 400b. In some implementations, the content encoder 110 and the neural network 470 are retrained using labeled data of input speech examples 402 and corresponding transcriptions. In this arrangement, the content encoder 110 functions as a feature extractor for encoding linguistic content from speech for improving speech recognition accuracy.

Notable encoder-decoder applications include voice transfer applications (e.g., "Say it like this") and data augmentation applications. In a typical voice transfer application, the content encoder 110 would receive speech from a first speaker and the style encoder 130 would receive different speech from a second speaker. The speech spoken by the first and second speakers may include different content. In this scenario, the decoder 150 may generate a synthesized speech representation that conveys the linguistic content of the speech from the first speaker but in the second speaker's voice. That is, the decoder 150 receives, as input, the latent representation of linguistic content 120 encoded by the content encoder 110 for the speech from the first speaker and the latent representation of speaking style 140 encoded by the style encoder 130 for the speech from the second speaker, and generates, as output, the synthetic speech that preserves the linguistic content of the speech from the first speaker and the speaking style of the second speaker. In data augmentation applications, latent representations of speaking style may be varied to produce different augmentations of synthesized speech from the decoder for a same linguistic content.

Figure 5:
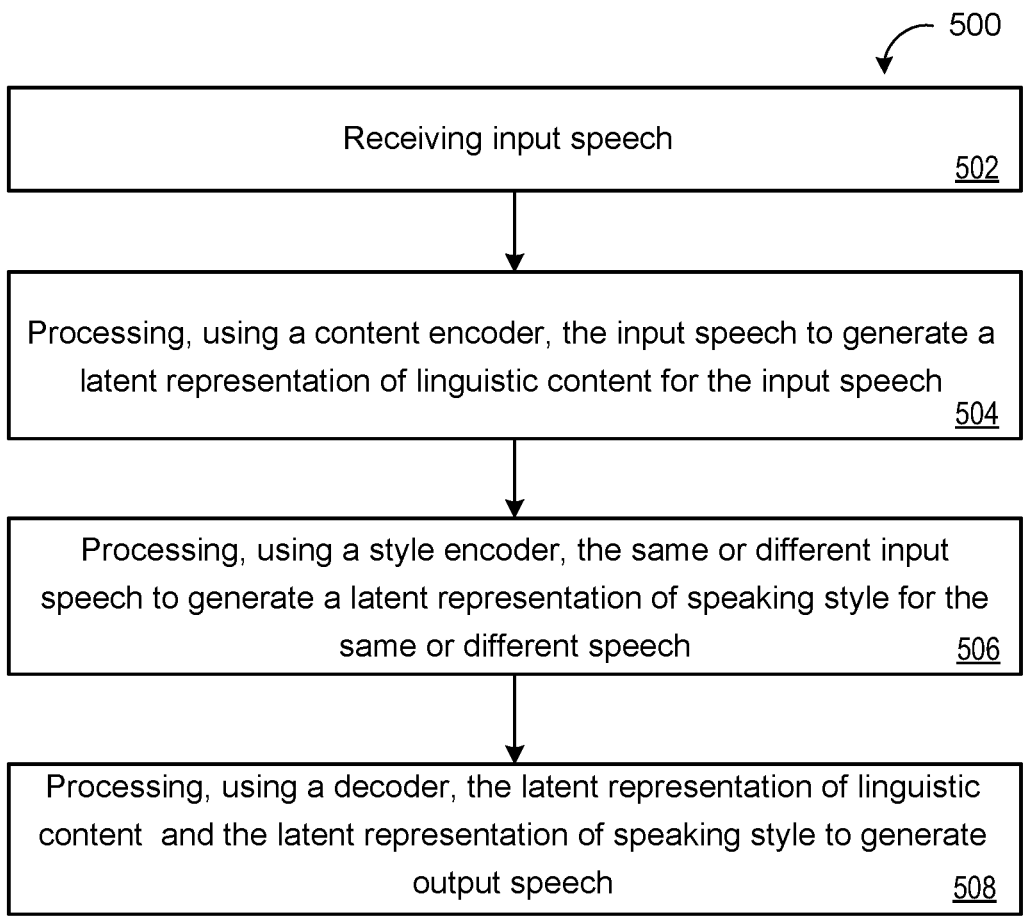
FIG. 5 is a flowchart of an example arrangement of operations for generating output speech.

FIG. 5 is a flowchart of an example arrangement of operations for a method 500 of generating output speech. Data processing hardware 22 may execute instructions stored on memory hardware 24 to cause the data processing hardware to perform the operations for the method 500. At operation 502, the method 500 includes receiving input speech 102, and at operation 504, the method 500 includes processing, using a content encoder 110, the input speech 102 to generate a latent representation of linguistic content 120 for the input speech 102. The content encoder 110 is trained to disentangle speaking style information from the latent representation of linguistic content 120.

At operation 506, the method 500 includes processing, using a style encoder 130, the same or different input speech to generate a latent representation of speaking style 140 for the same or different speech. The style encoder 130 is trained to disentangle linguistic content information from the latent representation of speaking style 140. At operation 508, the method 500 includes processing, using a decoder 150, the latent representation of linguistic content 120 for the input speech 102 and the latent representation of speaking style 140 for the same or different speech to generate the output speech.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
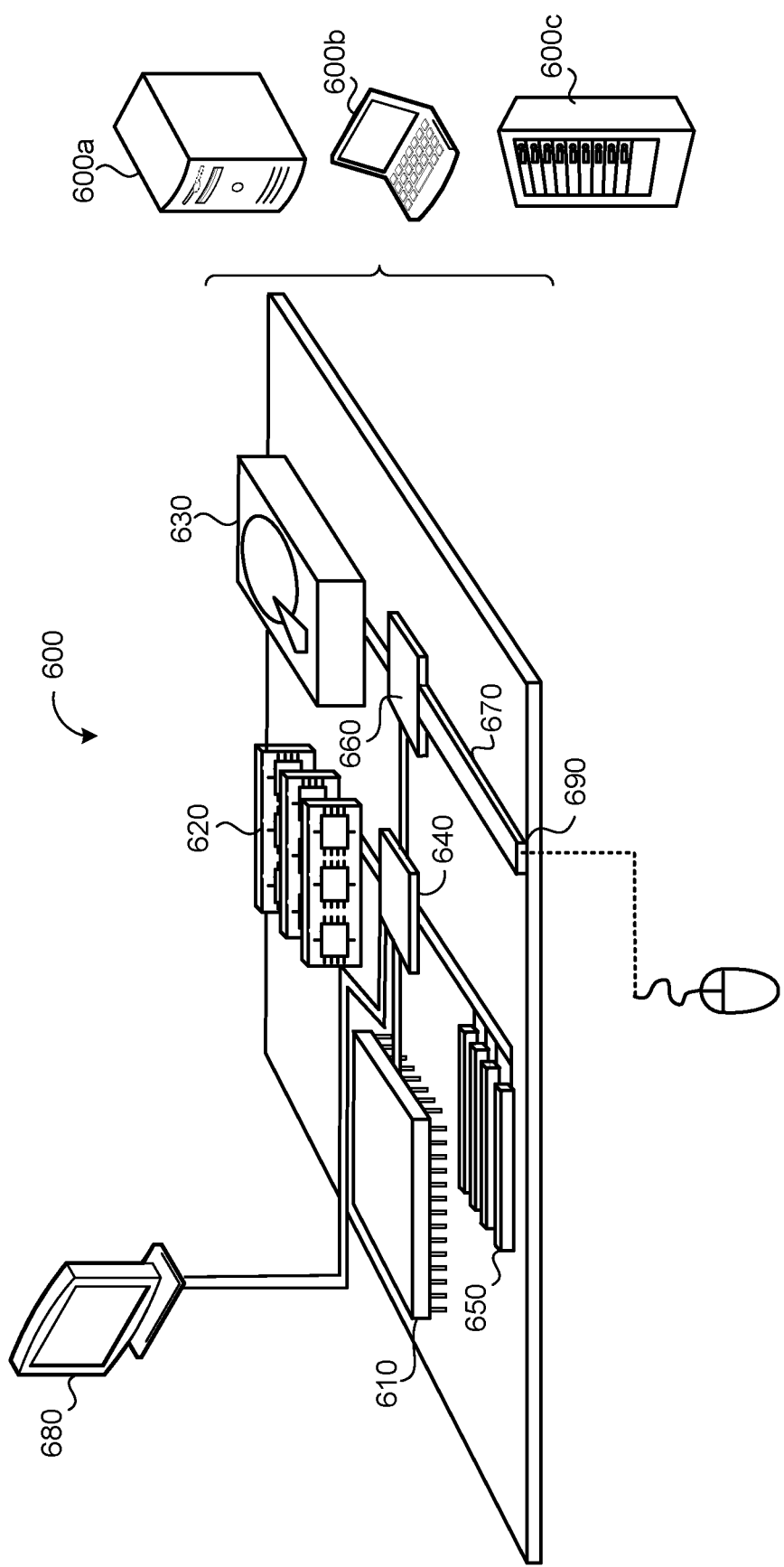
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A linguistic content and speaking style disentanglement model, the model comprising:
   a content encoder configured to:
   receive, as input, input speech; and
   generate, as output, a latent representation of linguistic content for the input speech, the content encoder trained to disentangle speaking style information from the latent representation of linguistic content;
   a style encoder configured to:
   receive, as input, the same or different input speech; and
   generate, as output, a latent representation of speaking style for the same or different input speech, the style encoder trained to disentangle linguistic content information from the latent representation of speaking style; and
   a decoder configured to generate output speech based on the latent representation of linguistic content for the input speech and the latent representation of speaking style for the same or different input speech;
   wherein the content encoder comprises:
   one or more convolutional layers configured to receive the input speech as input and generate an initial discrete per-timestep latent representation of the linguistic content; and
   a vector quantization (VQ) layer configured to apply an information bottleneck with straight-through gradients on each initial discrete per-timestep latent representation of the linguistic content to generate the latent representation of linguistic content as a sequence of latent variables representing the linguistic content from the input speech; and
   wherein the style encoder comprises:
   one or more convolutional layers configured to receive the input speech as input; and
   a variational layer with Gaussian posterior configured to summarize an output from the one or more convolutional layers with a global average pooling operation across the time-axis to extract a global latent style variable that corresponds to the latent representation of speaking style; and wherein the content encoder and the style encoder are trained using a mutual information loss to minimize mutual information captured in the latent representations of linguistic content and speaking style.

2. The model of claim 1, wherein the content encoder generates the latent representation of linguistic content as a discrete per-timestep latent representation of linguistic content that discards speaking style variations in the input speech.

3. The model of claim 1, wherein the content encoder is trained using a content VQ loss based on the latent representations of linguistic content generated for each timestep, the content VQ loss encouraging the content encoder to minimize a distance between an output and a nearest codebook.

4. The model of claim 1, wherein:
during training, the global style latent variable is sampled from a mean and variance of style latent variables predicted by the style encoder; and
during inference, the global style latent variable is sampled from the mean of the global latent style variables predicted by the style encoder.

5. The model of claim 1, wherein the style encoder is trained using a style regularization loss based on a mean and variance of style latent variables predicted by the style encoder, the style encoder using the style regularization loss to minimize a Kullback-Leibler (KL) divergence between a Gaussian posterior with a unit Gaussian prior.

6. The model of claim 1, wherein the decoder is configured to:
receive, as input, the latent representation of linguistic content for the input speech and the latent representation of speaking style for the same input speech; and
generate, as output, the output speech comprising a reconstruction of the input speech.

7. The model of claim 6, wherein the model is trained using a reconstruction loss between the input speech and the reconstruction of the input speech output from the decoder.

8. The model of claim 1, wherein the decoder is configured to:
receive, as input, the latent representation of linguistic content for the input speech and the latent representation of speaking style for the different input speech; and
generate, as output, the output speech comprising linguistic content information specified by the input speech and speaking style information specified by the different input speech.

9. A computer-implemented method when executed on data processing hardware causes the data processing hardware to perform operations comprising:
receiving input speech;
processing, using a content encoder, the input speech to generate a latent representation of linguistic content for the input speech, wherein the content encoder is trained to disentangle speaking style information from the latent representation of linguistic content;
processing, using a style encoder, the same or different input speech to generate a latent representation of speaking style for the same or different input speech, wherein the style encoder is trained to disentangle linguistic content information from the latent representation of speaking style; and
processing, using a decoder, the latent representation of linguistic content for the input speech and the latent representation of speaking style for the same or different input speech to generate output speech;

wherein the content encoder comprises:
one or more convolutional layers configured to receive the input speech as input and generate an initial discrete per-timestep latent representation of the linguistic content; and
a vector quantization (VQ) layer configured to apply an information bottleneck with straight-through gradients on each initial discrete per-timestep latent representation of the linguistic content to generate the latent representation of linguistic content as a sequence of latent variables representing the linguistic content from the input speech; and
wherein the style encoder comprises:
one or more convolutional layers configured to receive the input speech as input; and
a variational layer with Gaussian posterior configured to summarize an output from the one or more convolutional layers with a global average pooling operation across the time-axis to extract a global latent style variable that corresponds to the latent representation of speaking style; and wherein the content encoder and the style encoder are trained using a mutual information loss to minimize mutual information captured in the latent representations of linguistic content and speaking style.

10. The computer-implemented method of claim 9, wherein processing the input speech to generate the latent representation of linguistic content comprises processing the input speech to generate the latent representation of linguistic content as a discrete per-timestep latent representation of linguistic content that discards speaking style variations in the input speech.

11. The computer-implemented method of claim 9, wherein the content encoder is trained using a content VQ loss based on the latent representations of linguistic content generated for each timestep, the content VQ loss encouraging the content encoder to minimize a distance between an output and a nearest codebook.

12. The computer-implemented method of claim 9, wherein the operations further comprise:
during training, sampling the global style latent variable from a mean and variance of style latent variables predicted by the style encoder; and
during inference, sampling the global style latent variable from the mean of the global latent style variables predicted by the style encoder.

13. The computer-implemented method of claim 9, wherein the style encoder is trained using a style regularization loss based on a mean and variance of style latent variables predicted by the style encoder, the style encoder using the style regularization loss to minimize a Kullback-Leibler (KL) divergence between a Gaussian posterior with a unit Gaussian prior.

14. The computer-implemented method of claim 9, wherein the decoder is configured to:
receive, as input, the latent representation of linguistic content for the input speech and the latent representation of speaking style for the same input speech; and
process the latent representation of linguistic content for the input speech and the latent representation of speaking style for the same input speech to generate, as output, the output speech comprising a reconstruction of the input speech.

15. The computer-implemented method of claim 14, wherein the model is trained using a reconstruction loss between the input speech and the reconstruction of the input speech output from the decoder.

16. The computer-implemented method of claim 9, wherein the decoder is configured to:
  receive, as input, the latent representation of linguistic content for the input speech and the latent representation of speaking style for the different input speech; and
  the latent representation of linguistic content for the input speech and the latent representation of speaking style for the different input speech to generate, as output, the output speech comprising linguistic content information specified by the input speech and speaking style information specified by the different input speech.

* * * * *